US006141611A

United States Patent [19]

Mackey et al.

[11] Patent Number: 6,141,611

[45] Date of Patent: Oct. 31, 2000

[54] MOBILE VEHICLE ACCIDENT DATA SYSTEM

[75] Inventors: John J. Mackey, 36 Surf Rd., Lindenhurst, N.Y. 11757; Richard Pandolfi, Melville; Christopher J. Brogan, Jericho, both of N.Y.

[73] Assignees: John J. Mackey, Lindenhurst; Phoenix Group, Inc., Melville, both of N.Y.

[21] Appl. No.: 09/201,663

[22] Filed: Dec. 1, 1998

[51] Int. Cl.[7] .............................. G06F 7/00; G06F 19/00

[52] U.S. Cl. ................................ 701/35; 701/36; 701/24; 701/115; 701/33; 340/904; 340/905; 340/438

[58] Field of Search ................................ 701/35, 36, 24, 701/115, 33; 340/438, 904, 905

[56] References Cited

U.S. PATENT DOCUMENTS

| | | | |
|---|---|---|---|
| 4,281,354 | 7/1981 | Conte . | |
| 4,533,962 | 8/1985 | Decker et al. . | |
| 4,763,745 | 8/1988 | Eto et al. . | |
| 4,789,904 | 12/1988 | Peterson . | |
| 4,843,463 | 6/1989 | Michetti . | |
| 4,843,578 | 6/1989 | Wade . | |
| 4,939,652 | 7/1990 | Steiner . | |
| 4,992,943 | 2/1991 | McCracken | 701/35 |
| 5,111,289 | 5/1992 | Lucas et al. . | |
| 5,223,844 | 6/1993 | Mansell et al. | 342/357 |
| 5,353,023 | 10/1994 | Mitsugi | 340/989 |
| 5,499,182 | 3/1996 | Ousbourne | 701/35 |
| 5,548,273 | 8/1996 | Nicol et al. . | |
| 5,794,165 | 8/1998 | Minowa et al. | 701/1 |
| 5,797,134 | 8/1998 | McMillan et al. . | |
| 5,798,458 | 8/1998 | Monroe . | |
| 5,926,210 | 7/1999 | Hackett . | |
| 6,009,370 | 12/1999 | Minowa et al. | 701/102 |
| 6,037,860 | 3/2000 | Zander et al. | 340/436 |

*Primary Examiner*—William A. Cuchlinski, Jr.
*Assistant Examiner*—Olga Hernandez
*Attorney, Agent, or Firm*—Venable; Laurence J. Marhoefer

[57] ABSTRACT

One or more video cameras are mounted on the vehicle to make continuously a visual record of the scene in a region around the vehicle. Camera images during a time interval covering the current time and the recent past are stored on-board the vehicle, preferably, digitally recorded in a compressed format. In addition, data (e.g. one or more operating parameters such as speed, GPS data, engine, and/or brake operating parameters) from the vehicle's on-board embedded computers covering the present and recent past interval are also preferably digitally stored on-board the vehicle. An accident detector or detectors on-board the vehicle, for example a biaxial accelerometer, generate a trigger signal in response to an accident, such as the vehicle striking something or being struck by another vehicle. In response to an accident detector trigger signal, the data stored on-board the vehicle is automatically transmitted over a wireless link (e.g. public access links such as CDPD, satellite and Iredium or a private link) to a central data base. Data in the central data base is connected by a digital data network such as the Internet or a secured intranet and the data can be accessed via a computer terminal of an authorized party, such as an insurance adjuster for the company providing coverage to the vehicle, a self-insured entity, or a loss management facility.

4 Claims, 3 Drawing Sheets

MOBILE VEHICLE ACCIDENT DATA SYSTEM

BACKGROUND OF THE INVENTION

1. Field of the Invention

This invention relates to an improved system for generating and distributing near real time vehicle crash data, and more particularly, to a system that provides an accident scene record, which is automatically stored and is electronically accessible by authorized parties.

2. Description of the Prior Art

There have been a number of proposals in the prior art for on-board logging of vehicular data generally, and data relevant to vehicular accidents, in particular.

These prior art proposals require a person to act after an accident in order to make the accident data available for evaluation by authorized parties, such as insurance adjusters, risk management and loss control entities.

SUMMARY OF THE INVENTION

An object of this invention is the provision of a system for gathering and storing data related to vehicular incidents so that the data is automatically and electronically accessible by authorized parties.

Briefly, this invention contemplates the provision of one or more video cameras mounted on the vehicle to make continuously a visual record of the scene in a region around the vehicle. Camera images during a time interval covering the current time and the recent past are stored on-board the vehicle, preferably, digitally recorded in a compressed format. In addition, data (e.g. one or more operating parameters such as speed, GPS data, engine, and/or brake operating parameters) from the vehicle's on-board embedded computers covering the present and recent past interval are also preferably digitally stored on-board the vehicle. An accident detector or detectors on-board the vehicle, for example a biaxial accelerometer, generate a trigger signal in response to an accident, such as the vehicle striking something or being struck by another vehicle. In response to an accident detector trigger signal, the data stored on-board the vehicle is automatically transmitted over a wireless link (e.g. public access links such as CDPD, satellite and Iredium or a private link) to a central data base. Data in the central data base is connected by a digital data network such as the Internet or a secured intranet and the data can be accessed via a computer terminal of an authorized party, such as an insurance adjuster for the company providing coverage to the vehicle, a self-insured entity, or a loss management facility.

BRIEF DESCRIPTION OF THE DRAWINGS

The foregoing and other objects, aspects and advantages will be better understood from the following detailed description of a preferred embodiment of the invention, in which.

DETAILED DESCRIPTION OF A PREFERRED EMBODIMENT

Figure 1:
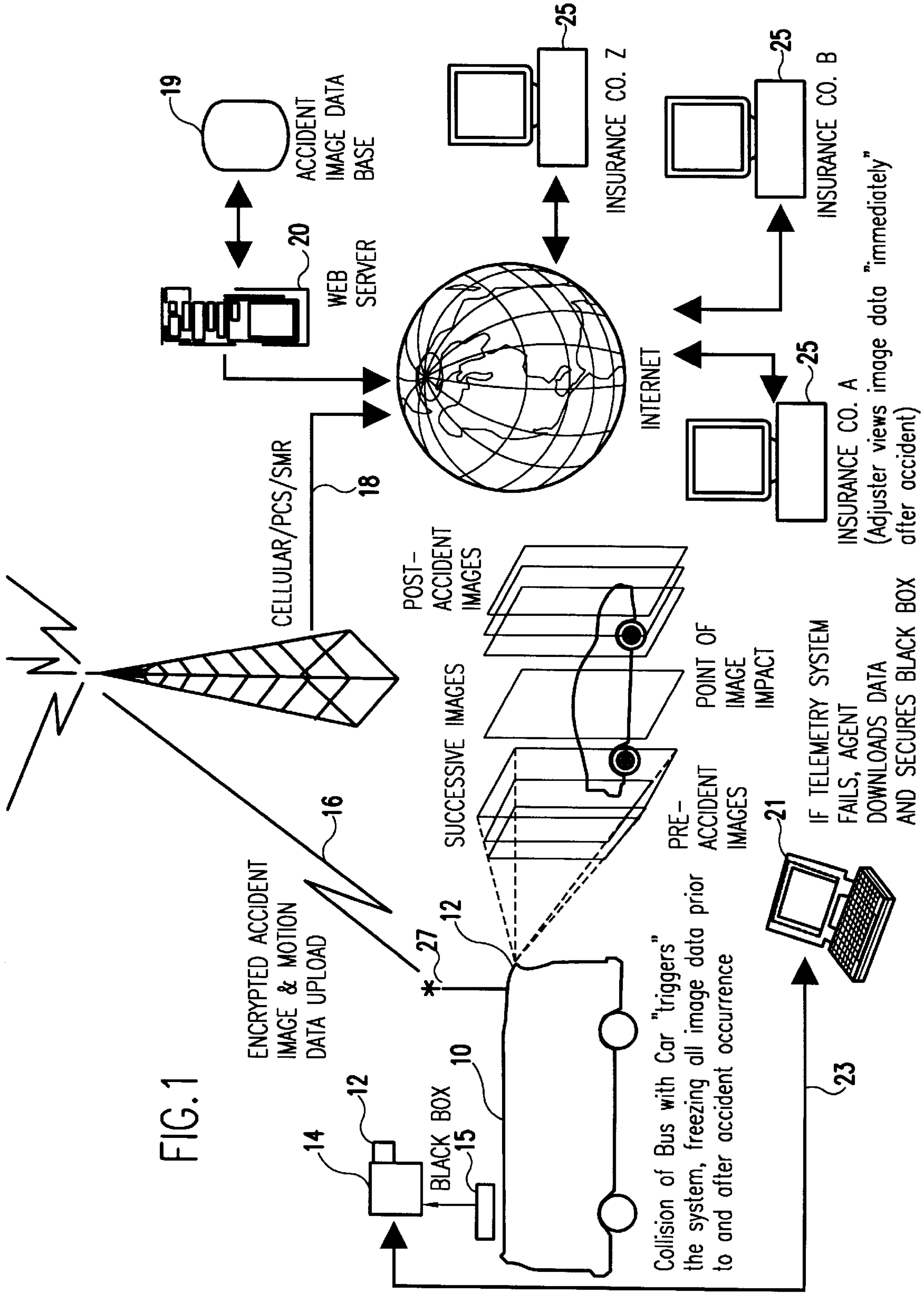
FIG. 1 is a pictorial diagram of one embodiment of a vehicular incident data system in accordance with the teachings of this invention.

Referring now to FIG. 1, a video camera 12 is mounted on the front of a vehicle 10 (e.g. a bus) with the camera's field of view directed forward of the vehicle so that the camera has a view similar to the forward field of view of the driver. Of course, the field of view of the camera can be directed in any desired direction and more than one camera can be used to extend the overall region covered including regions to the side and/or rear of the vehicle 10. In addition, the camera can be gimbel mounted so that its field of view does not necessarily change when the vehicle strikes something or is struck causing a sudden change in vehicle direction. In general, it is preferable that the field of view of the camera be outside the control of the driver. In a specific embodiment of the invention, the camera 12 is housed in a housing 14 that is able to withstand the considerable forces that may be experienced in the event of an accident. As will be explained in more detail in connection with FIG. 2, in addition to the digital video camera 12, the housing 14 contains system hardware and software to sense when an accident has occurred and to record and transmit successive video images and other data related to the accident scene and the vehicle's operation, prior to (pre-accident) during (point of impact) and immediately after (post accident) an accident. The other data includes data from the vehicle's on-board, embedded computers represented by the box 15 in FIG. 1. On-board, embedded computers are used in today's vehicles and will be used to a greater extent in the future. These computers can and will sense vehicle speed, engine and brake operating parameters and other data of interest in accident analysis. This data can be advantageously recorded along with the camera data.

The system automatically stores and locks the image data and other data after an accident and automatically transmits this accident image and other telemetry data via a wireless link 16 (e.g. a commercial cellular telephone or satellite link), and a network 18 to a central data base 19 and its network data base server 20. The system also includes an interface that allows the contents of the memory to be downloaded to a personal computer 21 over a hard wired bus 23. Any terminal 25 connected to the network 18 can, with the proper authorization code, access data in the data base 19.

Figure 2:
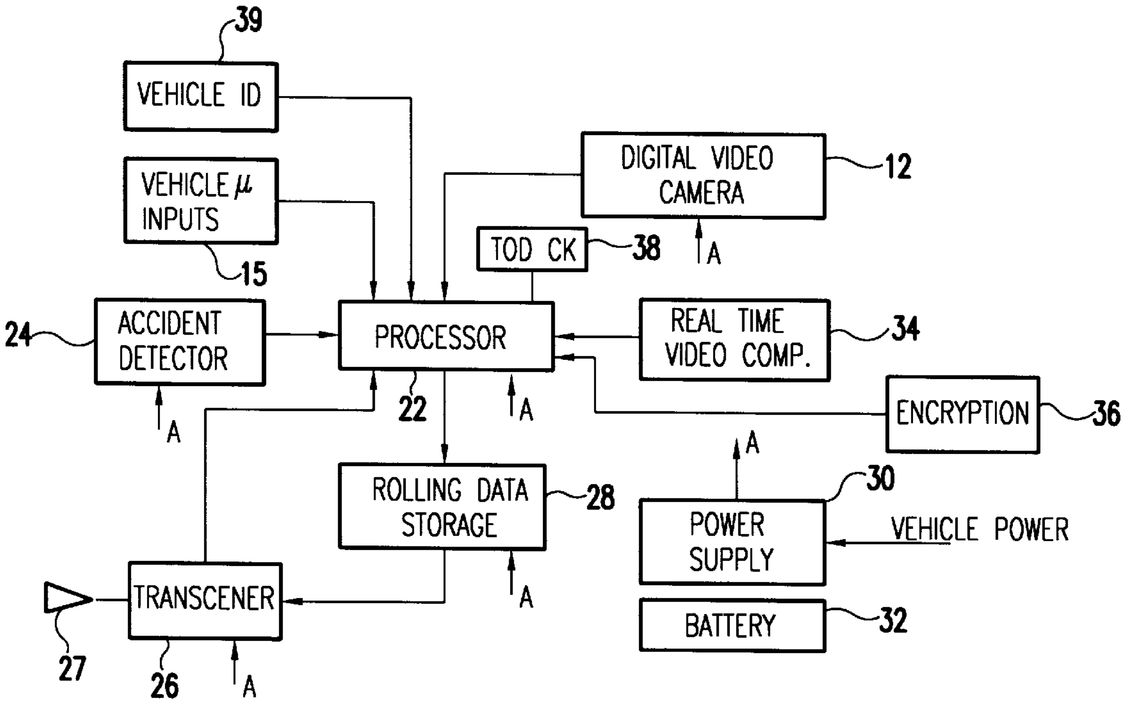
FIG. 2 is a functional block diagram of one embodiment of an on-board mobile accident camera system in accordance with the teachings of the invention.

Referring now to FIG. 2, as do most systems, the system on-board the vehicle includes both hardware and software and the functions are implemented by means of hardware and software in combination. The hardware components of the system include a processor 22, the digital video camera 12, inputs from the vehicle's onboard processor(s) 15, an accident detector 24, a wireless transceiver 26 and antenna 27, a data storage unit 28, and a power supply 30 with a backup battery 32. Major software components include the processor's operating system, application programs to implement the prescribed system functions, a real time video compression application program 34 (e.g. MPEG II), and an encryption application program 36. The processor 22 also includes a time of day clock 38 to date and time stamp the recorded data and a vehicle identification code 39 so that the record can be associated with a particular vehicle. In one embodiment of the invention, the housing 14 contains the system components including the camera. However, it will be appreciated, the system components need not be contained in a single housing. For example, the camera 12 could be mounted on the front of the vehicle while the remaining system components could be located in one or more housings located elsewhere in the vehicle. Typically, the antenna 27 would be located remotely from the housing or housings used to protect the other system components.

Figure 3:
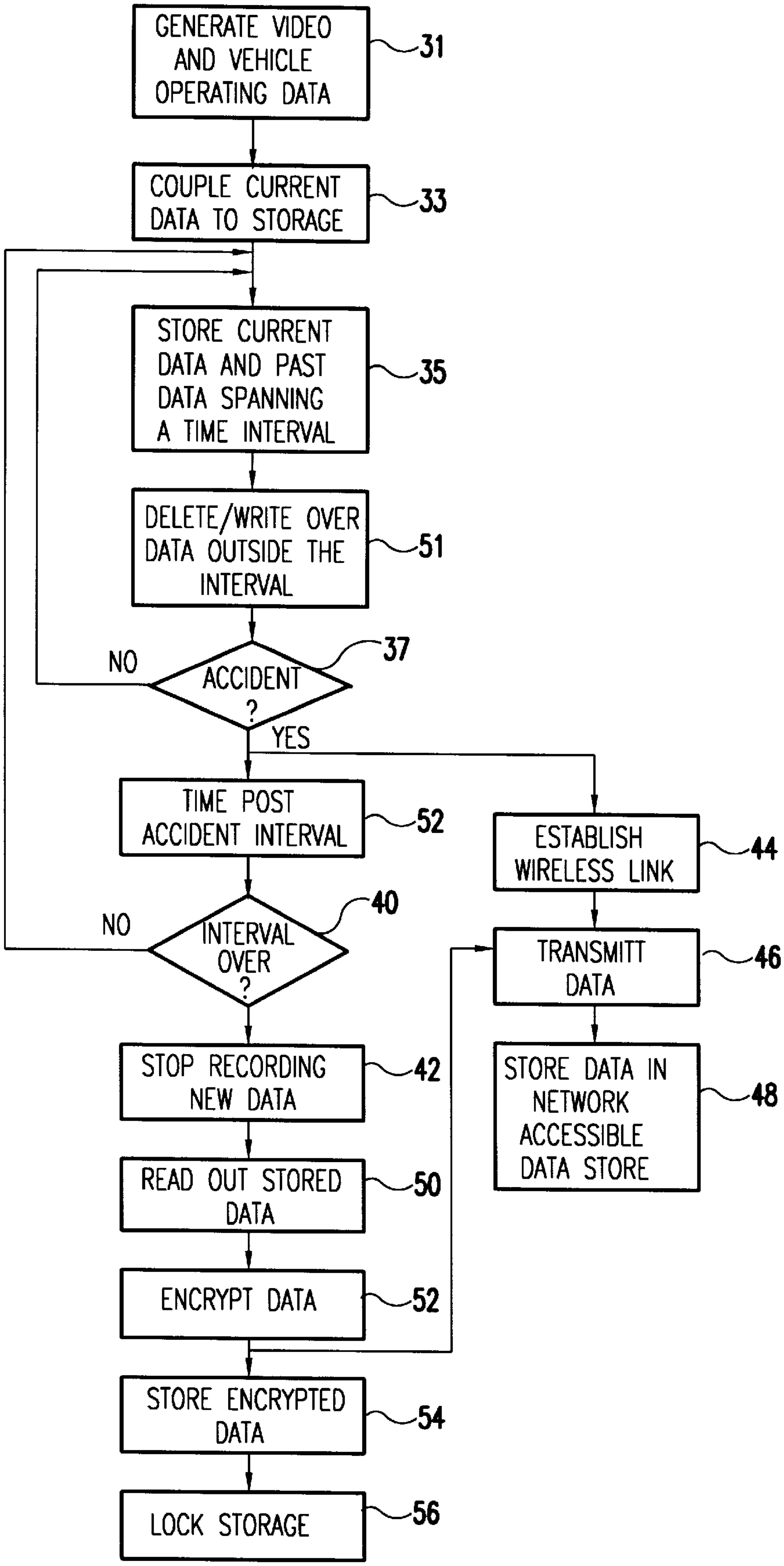
FIG. 3 is a flow chart of the steps used to capture and make available automatically accident data.

Referring now to FIG. 3 as well as FIGS. 1 and 2, in the operation of the system, in step 31, the video camera 12 generates a digital data stream, imaging a region or regions around the vehicle, for example, the region in front of the vehicle as seen by the vehicle's driver. The output of the camera 12 and processors 15 are coupled (step 33) to the processor 22 where the digital video signal is compressed in real time and then stored in the memory 28 on a first-in-first-out basis, storing, for example, about one minute of image data and processor data, step 35. The memory is written over when full, step 51.

The accident detector 24, for example a two axis accelerometer subsystem, generates a trigger (decision block 37) signal that is coupled to the processor when it detects the occurrence of an accident. With the two axis accelerometer, the output of each of two accelerometers is sampled (e.g. 2000 samples per second), and converted to digital sample values. These digital sample values are compared with stored "accident signature values" and if the digital sample values meet or exceed the signature values, the trigger signal is generated. It will be appreciated, the processor could perform the sampling and comparing functions to generate the trigger signal from any suitable transducer input.

In response to the accident trigger signal, the processor continues to store video data and on-board processor data for a predetermined interval and then stops storing new data, steps 39, 40 and 42. The system thusly permanently stores a sequence that encompasses a definable period of time before and after the accident. The processor 22 in response to the accident triggers a signal and also automatically activates the transceiver 26 (e.g., a cellular telephone) to establish the wireless link 16 (step 44) and the transceiver transmits the stored vehicle accident data (preferably after it has been encrypted) from the memory 28 via the wireless link 16 and the network link 18 to the central data storage 19 and server 20, steps 46 and 48.

The processor 22 reads out the stored video and processor data from memory 28 (step 50), encrypts it using the encryption program 36 (block 52), and stores the encrypted data back in the memory 28, step 54, as it is being transmitted by transceiveer 26 over wireless link 16. When the encrypted data has been stored in the memory, the processor locks the memory so that altered data cannot be stored in the memory, step 56. This provides two levels of tamper protection. In order to tamper with the stored data, a person would need keys to both decrypt the data and to encrypt it. In addition, he or she would have to defeat the memory lock in order to store altered data. The impact generated remote storage of photographic data will enable the system user to use the data as evidence.

While the invention has been described in terms of a single preferred embodiment, those skilled in the art will recognize that the invention can be practiced with modification within the spirit and scope of the appended claims. For example, an application within an elevator vehicle. The system can add a third axis accelerometer for detection of sudden falls or accelerations within the elevator vehicle cab.

Having thus described our invention, what we claim as new and desire to secure by Letters Patent is as follows:

1. A method for capturing vehicular accident data and automatically making it available to authorized parties including the steps of:

recording and storing data significant to the operation of said vehicle in a memory on-board said vehicle, said data including video data of a scene external to said vehicle, sensing the involvement of said vehicle in an accident, in response to said accident sensed in said sensing step, automatically encrypting said data and automatically transmitting said encrypted data to a data storage server remote from said vehicle over a wireless transmission link;

wherein said encrypted data is recorded and stored to cover an interval preceding and following an accident.

2. A method for capturing vehicular accident data as in claim 1 including the further step of coupling said encrypted data from said wireless link to a central data base connected to a network and accessible by terminals.

3. A method for capturing vehicular accident data as in claim 1 wherein after said data is encrypted following said accident, said encrypted data is re-recorded in encrypted form in said on-board memory.

4. A method for capturing vehicular accident data as in claim 1 wherein said data includes inputs from a vehicle's on board computers.

* * * * *